United States Patent
Liu et al.

(10) Patent No.: US 11,163,173 B2
(45) Date of Patent: *Nov. 2, 2021

(54) COLLIMATING LENS

(71) Applicant: JIANGXI LIANYI OPTICS CO., LTD., Nanchang (CN)

(72) Inventors: Xuming Liu, Nanchang (CN); Haojie Zeng, Nanchang (CN); Jiyong Zeng, Nanchang (CN)

(73) Assignee: JIANGXI LIANYI OPTICS CO., LTD., Nanchang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/326,377

(22) PCT Filed: Apr. 2, 2018

(86) PCT No.: PCT/CN2018/081611
§ 371 (c)(1),
(2) Date: Feb. 19, 2019

(87) PCT Pub. No.: WO2019/169683
PCT Pub. Date: Sep. 12, 2019

(65) Prior Publication Data
US 2021/0026155 A1   Jan. 28, 2021

(30) Foreign Application Priority Data
Mar. 9, 2018  (CN) .......................... 201810195341.7

(51) Int. Cl.
  G02B 27/30   (2006.01)
  G02B 3/04    (2006.01)
  H04N 13/204  (2018.01)
(52) U.S. Cl.
  CPC ............. *G02B 27/30* (2013.01); *G02B 3/04* (2013.01); *H04N 13/204* (2018.05)

(58) Field of Classification Search
  CPC .................... G02B 27/30; G02B 19/0014; G02B 19/0028; G02B 27/0966; G02B 5/045;
(Continued)

(56) References Cited

U.S. PATENT DOCUMENTS

2018/0024334 A1\* 1/2018 Asami .................. G02B 13/004
                                                      359/654
2020/0124825 A1\* 4/2020 Liu ........................ G02B 13/18

FOREIGN PATENT DOCUMENTS

CN     1172964 A      2/1998
CN     107505689 A    12/2017

OTHER PUBLICATIONS

International Search Report issued in corresponding international application No. PCT/CN2018/081611, dated Nov. 28, 2018.

\* cited by examiner

*Primary Examiner* — William R Alexander
*Assistant Examiner* — Sharrief I Broome

(57) ABSTRACT

The disclosure provides a collimating lens. In order from a laser transmitter side to a to-be-measured object side, the collimating lens includes a first lens, a second lens, a third lens and an aperture stop. The first lens is a lens with positive power and includes a convex object side surface. The second lens is a lens having negative power and includes a concave object side surface. The third lens is a lens having positive power and includes a convex image side surface. The change rate of the refractive index of the first lens with temperature in the range of 0 to 60° C. satisfies that $(dn/dt)1 > -10 \times 10^{-6}/°C$. So, the aging of the lens can be effectively delayed. With the same size laser transmitter, the focal length of the system is larger, the field of view angle is smaller.

20 Claims, 12 Drawing Sheets

(58) Field of Classification Search
CPC ............ G02B 19/0057; G02B 19/0052; G02B 27/0025; G02B 27/0961; G02B 5/04; G02B 2027/0123; G02B 27/0172; G02B 19/0066; G02B 2027/011; G02B 2027/0116; G02B 2207/123; G02B 27/0101; G02B 27/0905; G02B 27/0927; G02B 27/1006; H01S 5/005; H01S 5/02253; H01S 5/4012; H01S 5/02325; H01S 5/4025; H01S 3/005; H01S 5/02208; H01S 5/02251; H01S 5/423; H01S 3/094053; H01S 3/09415; H01S 3/1611; H01S 5/0071; H01S 5/02212; H01S 5/02257; H01S 5/02326; H01S 5/0687; H01S 5/4031; H01S 5/405; H01S 2301/203; B23K 2103/50; B23K 26/0648; B23K 26/0665; B23K 26/38; B23K 2103/08; B23K 2103/12; B23K 2103/18; B23K 26/04; B23K 26/046; B23K 26/06; B23K 26/066; B23K 26/1476; B23K 26/21; B23K 26/382; B23K 26/384; B23K 26/40; B23K 26/402; B23K 26/702; B23K 26/707

See application file for complete search history.

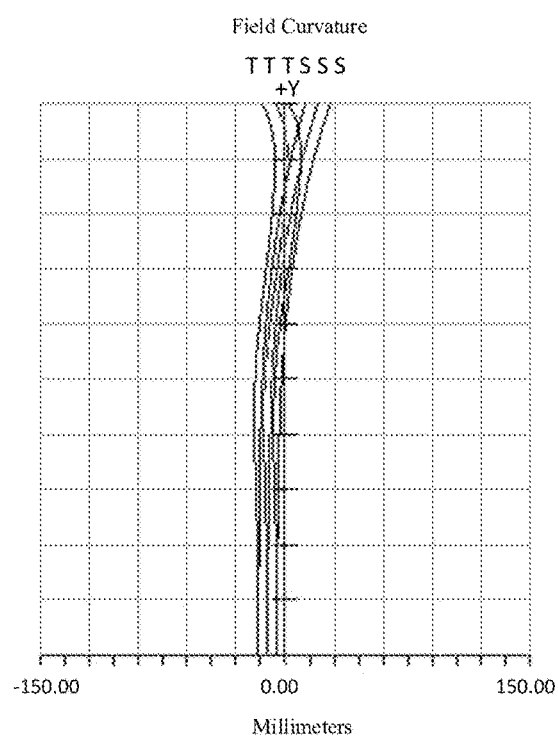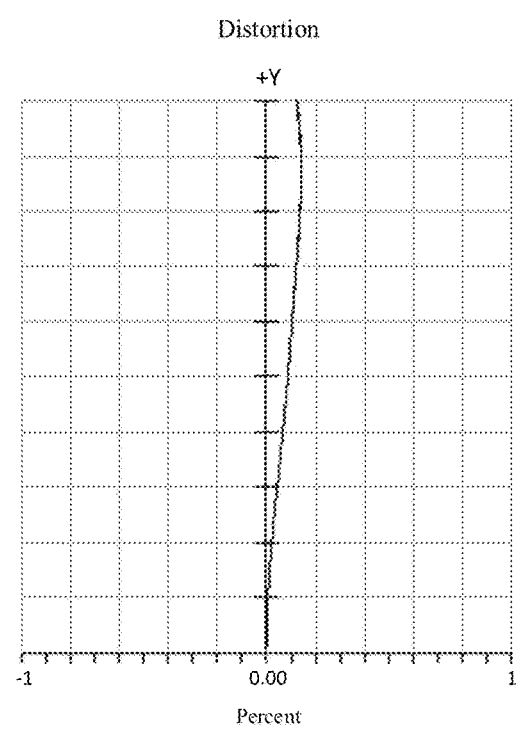
FIG. 3a                    FIG. 3b

COLLIMATING LENS

CROSS-REFERENCE TO RELATED APPLICATION

This application claims priority to a Chinese patent application No. 201810195341.7 filed on Mar. 9, 2018, titled "COLLIMATING LENS".

TECHNIQUE FIELD

The present disclosure relates to a technical field of camera lenses, and particularly to a collimating lens.

BACKGROUND

With the rapid development of mobile phones, innovative technologies for the camera function of mobile phones continue to emerge, for example, the 3D imaging technology pushed by Apple inc. The 3D imaging technology is one kind of optical sensing technology based on 3D structured light. The 3D imaging technology can be used for face recognition, gesture recognition and camera function enhancement. The 3D imaging technology can also be used for developing new applications for augmented reality (AR) and transforming optical images from two-dimensional to three-dimensional space, resulting in a more realistic and clear perception experience.

3D structured light technology can be used for three-dimensional space restoration. After a specific laser information is projected onto a surface of an object, the optical information is collected by a camera, and the position and depth of the object are calculated according to the change of the optical information caused by the object, thereby restoring the entire three-dimensional space. The specific laser information is a very important indicator in the 3D structured light technology. Therefore, requirements for a collimating lens for projecting the laser information onto the surface of a to-be-measured object are very high. The collimating lens can be used for projecting lights with a specific solid angle emitted from a point light source array on a surface of a Vertical Cavity Surface Emitting Laser (VCSEL) to the surface of the to-be-measured object. The collimating lens is a key component of a 3D imaging quality.

In such products, as the ambient temperature changes, the focal length f of a lens changes greatly, which causes the angle of the projected light of the lens to change significantly. The change of the angle of the projected light of the lens changes the original optical information, which may result in errors in the calculation of the entire system and then affect a contour restoration accuracy of the three-dimensional object. Similarly, as the temperature changes, the imaging point of the collimating lens becomes larger, which may also cause the system to reduce the sharpness of the three-dimensional object. Therefore, it is important to make the angle of view and the size of the spot of the light information projected onto the to-be-measured object do not change greatly as the ambient temperature changes.

In addition, a first lens of the conventional collimating lens close to the laser emitter is a plastic lens. The plastic lens is easy to age, and the reliability test of this lens is difficult to pass.

SUMMARY

The present disclosure aims to at least solve one of the technical problems existing in the related art. For this purpose, the object of the present disclosure is to provide a collimating lens with a stable focal length at different temperatures and a more reliable.

According to the collimating lens provided by the present disclosure, in order from a laser transmitter side to a to-be-measured object side, the collimating lens may include:

a first lens with positive refractive power, including a convex object side surface;

a second lens with negative refractive power, including a concave object side surface;

a third lens with positive refractive power, including a convex image side surface;

an aperture stop on the to-be-measured object side;

optical centers of each lens being on a same line;

the collimating lens satisfying the following conditions:

$f1 < f23;$ $(dn/dt)1 > -10 \times 10^{-6}/° C.;$ $(dn/dt)2 < -50 \times 10^{-6}/° C.;$ $(dn/dt)3 < -50 \times 10^{-6}/° C.;$ wherein, the laser transmitter side is an object side, the to-be-measured object side is an image side, f1 is a focal length of the first lens, f23 is a combined focal length of the second lens and the third lens, (dn/dt)1 is a change rate of a refractive index of the first lens with temperature in a range of 0~60° C., (dn/dt)2 is a change rate of a refractive index of the second lens with temperature in a range of 0~60° C., and (dn/dt)3 is a change rate of a refractive index of the third lens with temperature in a range of 0~60° C. According to the collimating lens provided by the present disclosure, due to the refractive index of each lens is distributed reasonably with temperature, an effect of the thermal expansion the lens itself and the structural components can be offset. So that the focal length can be stabilized and applied to different temperature. For every 10 degrees Celsius change in temperature, the effective focal length variation of the collimating lens is less than 0.001 mm, so that the angle of the projected light of the lens is not change significantly, and the original optical information is not changed significantly. In the collimating lens provided by the present disclosure, the first lens is close to the laser emitter end. The change rate of the refractive index of the first lens with temperature in the range of 0 to 60° C. satisfies that $(dn/dt)1 > -10 \times 10^{-6}/° C.$ So, the aging of the lens can be effectively delayed. The collimating lens is more reliable and easier to pass the reliability test, and the test results are stable.

Further, the collimating lens may satisfy the following condition:

$TTL/f < 1.0,$ wherein, TTL is a total length of the collimating lens, and f is a focal length of the collimating lens.

Further, an image side surface and an object side surface of the first lens, the second lens, the third lens, and the fourth lens are aspherical surfaces.

Further, the collimating lens may satisfy the following condition:

$0 < f3/f1 < 5,$ wherein, f3 is a focal length of the third lens, and f1 is a focal length of the first lens.

Further, the collimating lens may satisfy the following condition:

$$0<f/r1<10,$$

wherein, f is a focal length of the collimating lens, and r1 is a radius of curvature of the object side surface of the first lens.

Further, the collimating lens may satisfy the following condition:

$$-10<r1/r6<0,$$

wherein, r1 is a radius of curvature of the object side surface of the first lens, r6 is a radius of curvature of the image side surface of the third lens.

Further, the collimating lens may satisfy the following condition:

$$0<CT3/CT1<5,$$

wherein, CT1 is a center thickness of the first lens, and CT3 is a center thickness of the third lens.

Further, an image side surface and an object side surface of the first lens, the second lens and the third lens are aspherical surfaces.

Further, the first lens is made of glass, the second lens and the third lens are made of plastic.

Further, a shape of the aspherical surface of each lens may satisfy the following condition:

$$z = \frac{ch^2}{1+\sqrt{1-(1+k)c^2h^2}} + Bh^4 + Ch^6 + Dh^8 + Eh^{10} + Fh^{12} + Gh^{14} + Hh^{16},$$

wherein, z is a vector height between a position on the aspheric surface and a vertex of the aspheric surface along an optical axis of the collimating lens, c is a curvature of the aspheric surface, k is a quadratic surface coefficient, h is a distance between the position and the optical axis, B is a fourth order surface coefficient, C is a sixth order surface coefficient, D is an eighth order surface coefficient, E is a tenth order surface coefficient, F is a twelve order surface coefficient, G is a fourteen order surface coefficient, H is a sixteen order surface coefficient.

The advantages of the disclosure will be set forth in part in the description of the following embodiments.

BRIEF DESCRIPTION OF THE DRAWINGS

The above and/or additional aspects and advantages of the present disclosure will be more straightforward.

FIG. 3a is a field curve diagram of the collimating lens according to a first embodiment of the present disclosure at 40° C. and 300 mm image distance. In FIG. 3a, the x-axis shows a field curvature value, the coordinate unit of the x-axis is millimeter, and the y-axis shows a field of view defined by an object height.

FIG. 3b is a distortion diagram of a collimating lens according to the first embodiment of the present disclosure at 40° C. and 300 mm image distance. In FIG. 3b, the x-axis shows a distortion value, the coordinate unit of the x-axis is percentage, and the y-axis shows a field of view defined by the object height.

DETAILED DESCRIPTION OF PREFERRED EMBODIMENTS

Figure 1:
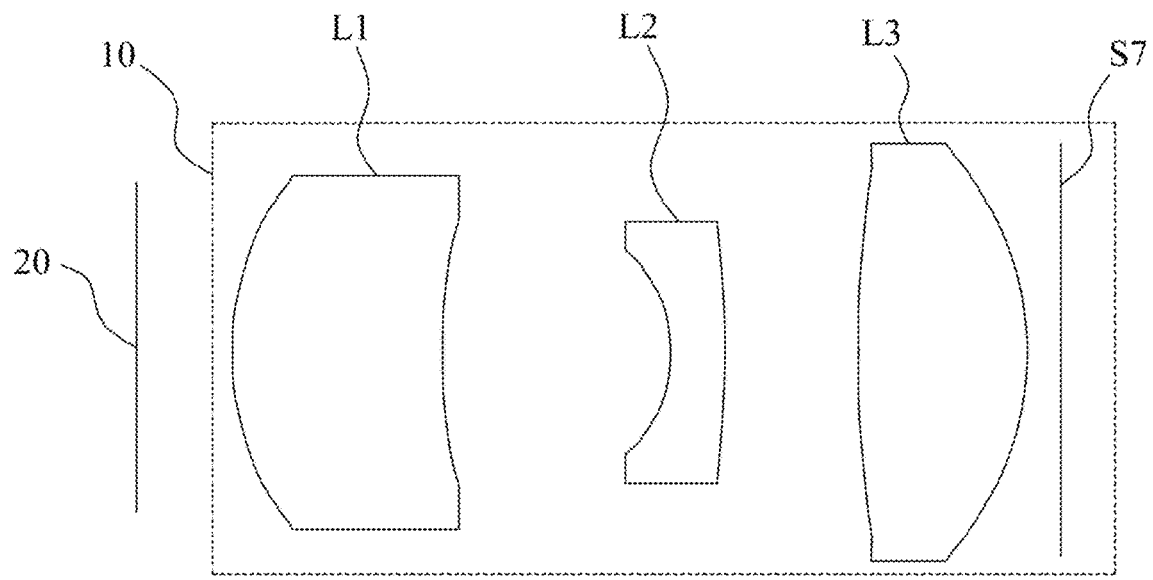
FIG. 1 is a schematic cross-sectional view of a collimating lens according to an embodiment of the present disclosure.

The specific embodiments of the present disclosure are described in detail below with reference to the accompanying drawings. Several embodiments of the disclosure are presented in the drawings. However, the disclosure may be embodied in many different forms and is not limited to the embodiments described herein. Rather, these embodiments are provided so that this disclosure will be thorough and comprehensive.

Unless otherwise defined, all technical and scientific terms used herein have the same meaning, the terminology used in the description of the present disclosure is for the purpose of describing particular embodiments and is not intended to limit the disclosure. The term "and/or" used herein includes any and all combinations of one or more of the associated listed items.

Referring to FIG. 1, a collimating lens 10 according to an embodiment of the present disclosure may include a first lens L1, a second lens L2, a third lens L3, and an aperture stop S9. The first lens L1 has positive refractive power. The second lens L2 has negative refractive power. The third lens L3 has positive refractive power. The aperture stop S7 is close to a to-be-measured object side (i.e. an image side). Optical centers of each lens may be on a same line.

The first lens L1 has positive refractive power and a convex object side surface, thereby a telecentric beam from the laser emitter 20 being converged. The first lens L1 provides sufficient positive power and can effectively control an overall volume of the optical lens unit.

The second lens L2 has a negative refractive power and a concave object side surface. An aberration generated by the first lens L1 can be effectively reconciled, and a focusing ability of the working band can be controlled.

The third lens L3 has a positive refractive power and a convex image side surface. An aberration generated by optical lens can be effectively reconciled, the angle of exit can be controlled.

The object side surface and the image side surface of the first lens L1, the second lens L2, and the third lens L3 are aspherical surfaces. That is, the object side surface and the image side surface of the first lens L1, the second lens L2, and the third lens L3 are formed into a shape other than a spherical surface, thereby more control variables can be obtained to reduce aberrations.

The fourth lens L4 has a positive refractive power and a convex image side surface. Both an image side surface and an object side surface of the fourth lens L4 are aspherical surfaces. An aberration of the optical lens can be effectively corrected, thereby an emitting angle of the light can be effectively controlled.

The collimating lens 10 provided by the present embodiment may satisfy the following condition:

$f1 < f23$;

$(dn/dt)1 > -10 \times 10^{-6}/° C.$;

$(dn/dt)2 < -50 \times 10^{-6}/° C.$;

$(dn/dt)3 < -50 \times 10^{-6}/° C.$;

wherein, the laser transmitter side is an object side, the to-be-measured object side is an image side, f1 is a focal length of the first lens, f23 is a combined focal length of the second lens and the third lens, (dn/dt)1 is a change rate of a refractive index of the first lens with temperature in a range of 0~60° C., (dn/dt)2 is a change rate of a refractive index of the second lens with temperature in a range of 0~60° C., and (dn/dt)3 is a change rate of a refractive index of the third lens with temperature in a range of 0~60° C.

In the above collimating lens, due to the refractive index of each lens is distributed reasonably with temperature, an effect can be offset by the influence of the thermal expansion focal length of the lens itself and the structural components can be offset. So that the focal length can be stabilized and applied to different temperature. For every 10 degrees Celsius change in temperature, the effective focal length variation of the collimating lens is less than 0.001 mm, so that the angle of the projected light of the lens is not change significantly, and the original optical information is not changed significantly. Compared with the related art, with the same size VCSEL (laser transmitter), the focal length of the system is larger, and the field of view angle is smaller, and the 3D structured light algorithm is more suitable to be applied.

Figure 2:
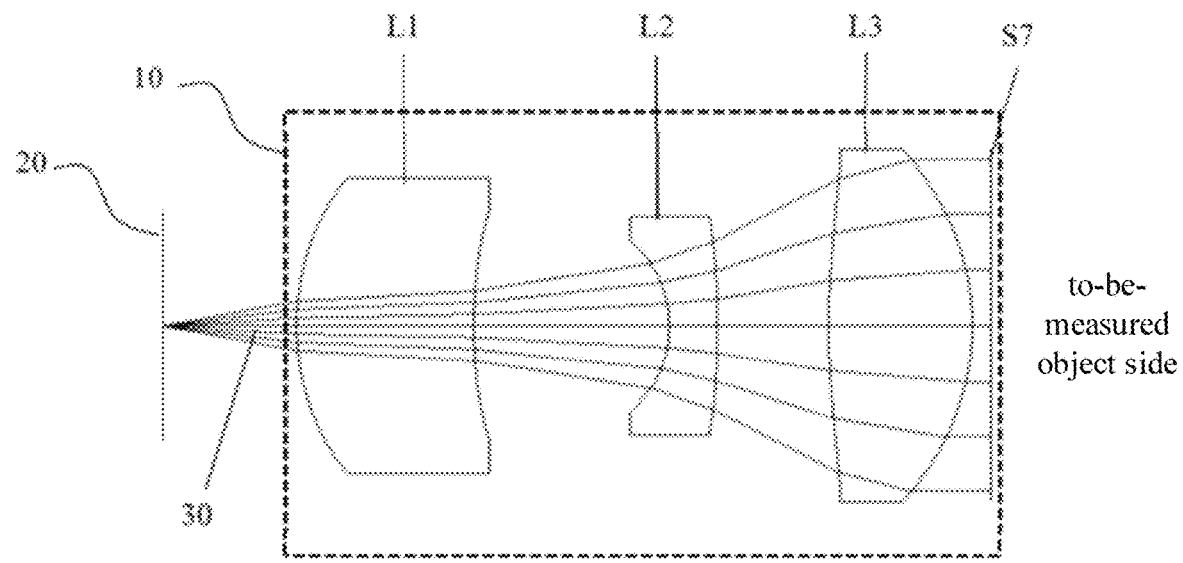
FIG. 2 is a schematic cross-sectional view of the collimating lens of FIG. 1, illustrating optical path of lasers emitted from a laser emitter.

An optical line of the emitted light 30 of the laser emitter 20 passing through the collimating lens 10 is as shown in FIG. 2. In the collimating lens 10 provided by the present disclosure, the first lens L1 is close to the laser emitter end 20. The change rate of the refractive index of the first lens L1 with temperature in the range of 0 to 60° C. satisfies that $(dn/dt)1 > -10 \times 10^{-6}/°$ C. Because of the laser emitter is a light source, the first lens near the light source is made of glass, the aging of the lens can be effectively delayed. The collimating lens is more reliable and easier to pass the reliability test, and the test results are stable. At the same time, the second lens L2 and the third lens L3 which are far away from the light source can be made of plastic material, thereby the production costs can be effectively reduced.

In the above collimating lens 10, the difference between a focal length of the first lens f and a combined focal length of the second lens and the third lens f23 is less than 0. That is, the collimating lens 10 satisfies f1<f23. This condition of f23 and f1 limits the combination of the second lens L2 and the third lens L3 to be weaker in light deflection than the first lens L1.

Further, the change rate of the refractive index of the first lens L1 with temperature in the range of 0 to 60° C. (dn/dt)1 satisfies that (dn/dt)1>−10×10-6/° C., the change rate of the refractive index of the second lens L2 with temperature in the range of 0 to 60° C. (dn/dt)2 satisfies that (dn/dt)2<−50×10-6/° C., the change rate of the refractive index of the third lens L3 with temperature in the range of 0 to 60° C. (dn/dt)3 satisfies that (dn/dt)2<−50×10-6/° C. This condition of (dn/dt)1, (dn/dt)2 and (dn/dt)3 limits the change rate of the refractive index of three lenses with temperature, and is mainly used to reasonably match the thermal expansion of the lens to ensure the stability of the lens focal length at different temperatures.

Further, a total length TTL of the collimating lens 10 and a focal length f of the collimating lens 10 may satisfy a condition: TTL/f<1.0. The condition limits the proportional relationship between the total length of the collimating lens and the focal length of the collimating lens, and can achieve a purpose of system miniaturization in the case of a long focal length of the collimating lens. Specifically, the total length TTL of the collimating lens 10 is less than 3.5 mm, and the focal length f of the collimating lens 10 is greater than 3.5 mm. Better optical characteristics can be ensured and the 3D structured light algorithm is more suitable to be implemented.

Further, the ratio of the focal length f3 of the third lens to the focal length f1 of the first lens is 0<f3/f1<5. This condition of f3 and f1 limits the ratio of the first lens L1 to the third lens L3, and is mainly used to concentrate the light passing through the third lens L3 on the imaging surface and reduce an aberration of the collimating lens.

Further, the ratio of the focal length f of the collimating lens 10 to the radius of curvature r1 of the object side surface of the first lens L1 is 0<f/r1<10. This condition of f and r1 limits the shape of the side surface of the first lens L1, which facilitates the processing of the lens and reduces the tolerance sensitivity.

Further, a ratio of a radius of curvature r1 of the object side surface of the first lens L1 to a radius of curvature r6 of the image side surface of the third lens L3 is −10<r1/r6<0. This condition of r1 and r6 limits the orientation of the object side surface of the first lens L1 and the image side surface of the third lens side L3, and is mainly used to concentrate the light passing through the third lens L3 on the imaging surface and reduce an aberration of the collimating lens.

Further, the ratio of the center thickness CT3 of the third lens L3 to the center thickness CT1 of the first lens L1 is 0<CT3/CT1<5. This condition of CT3 and CT1 limits the ratio of the center thickness CT3 of the third lens L3 to the center thickness CT1 of the first lens L1. The condition of CT3 and CT1 is beneficial to processing and of the optical lens group by appropriately arranging the center thickness of the lens.

Further, an image side surface and an object side surface of the first lens L1, the second lens L2 and the third lens L3 are aspherical surfaces, thereby more control variables can be obtained to reduce aberrations.

In summary, the collimating lens 10 is smaller in size, capable of achieving stable focal length and suitable for different temperature applications. The refractive index of each lens is distributed reasonably with the change rate of temperature and the coefficient of thermal expansion, therefore, the angle of the projecting light of the lens does not change significantly, and the original optical information is not changed significantly. With the same size VCSEL (laser transmitter), the focal length of the system is larger, the field of view angle is smaller, and the 3D structured light algorithm is more suitable to be applied. The first lens near the light source is made of glass, the aging of the lens can be effectively delayed. The collimating lens is more reliable and easier to pass the reliability test and the test results are stable.

The disclosure is further illustrated by the following various examples. In each of the following embodiments, the thickness and the radius of curvature of each lens in the collimating lens are different. For specific differences, refer to the parameter table in each embodiment. The following embodiments are merely preferred embodiments of the present disclosure, however the embodiments of the present disclosure are not limited by the following embodiments. Any other changes, substitutions, combinations or simplifications made without departing from the innovation of the disclosure are considered to be equivalent replacements and are included in the scope of the present disclosure.

In all embodiments of the disclosure, r is the radius of curvature of the apex of the optical surface, d is the optical surface spacing (the distance between the apexes of two adjacent optical surfaces), nd is the refractive index of each lens, and Vd is the Abbe number of each lens and is used to measure the degree of light dispersion of the medium.

In various embodiments of the disclosure, a shape of the aspherical surface of each lens may satisfy the following equation:

$$z = \frac{ch^2}{1+\sqrt{1-(1+k)c^2h^2}} + Bh^4 + Ch^6 + Dh^8 + Eh^{10} + Fh^{12} + Gh^{14} + Hh^{16}.$$

Wherein, z is a vector height between a position on the aspheric surface and a vertex of the aspheric surface along an optical axis of the collimating lens, c is a curvature of the aspheric surface, k is a quadratic surface coefficient, h is a distance between the position and the optical axis, B is a fourth order surface coefficient, C is a sixth order surface coefficient, D is an eighth order surface coefficient, E is a tenth order surface coefficient, F is a twelve order surface coefficient, G is a fourteen order surface coefficient, H is a sixteen order surface coefficient, z is a distance of the surface away from the vertex of the surface in the direction of the optical axis, c.

In each of the following embodiments, the thickness and the radius of curvature of each lens in the collimating lens are different. For details, refer to the parameter table of each embodiment.

The First Embodiment

Figure 4:
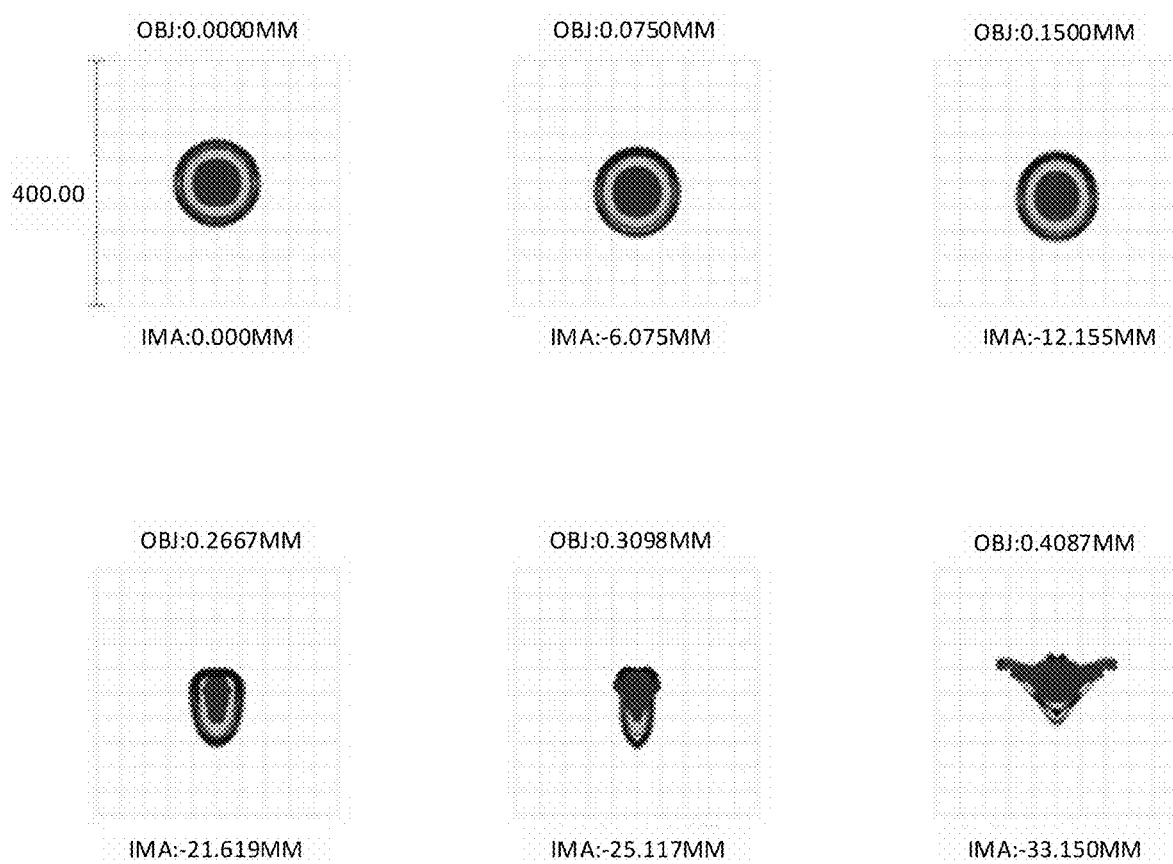
FIG. 4 is a schematic view showing the size and shape of an imaging point of the collimating lens according to the first embodiment of the present disclosure at 40° C. and 300 mm image distance, the unit of size is micrometers.

The cross-sectional structure diagram of the collimating lens of this embodiment can be shown in FIG. 1. In this embodiment, the second lens L2 is an aspherical lens including a convex image side surface and a concave object side surface. The optical characteristic curves of the collimating lens in this embodiment are respectively shown in FIG. 3a, FIG. 3b and FIG. 4. Related parameters of each lens in the collimating lens are shown in Table 1-1.

TABLE 1-1

| Surface No. | Surface type | r | d | $n_d$ | Vd |
|---|---|---|---|---|---|
| 1 | Object surface | Spherical surface | — | 0.54 | | |
| 2 | The first lens | Aspheric surface | 1.023818 | 0.719620 | 1.805881 | 40.8881 |
| 3 | | Aspheric surface | 2.180684 | 0.789559 | | |
| 4 | The second lens | Aspheric surface | −0.472099 | 0.194122 | 1.639730 | 23.5289 |
| 5 | | Aspheric surface | −5.241208 | 0.452822 | | |
| 6 | The third lens | Aspheric surface | 2.842702 | 0.581173 | 1.544514 | 56.0033 |
| 7 | | Aspheric surface | −0.982177 | 0.072767 | | |
| 8 | The aperture stop | Spherical surface | — | 300 | | |
| 9 | The image surface | Spherical surface | — | — | | |

The parameters of the aspheric surfaces of the lenses of this embodiment are shown in Table 1-2.

TABLE 1-2

| Surface No. | k | B | C | D | E | F | G | H |
|---|---|---|---|---|---|---|---|---|
| 2 | 0 | 0.125400 | −0.332333 | 2.411751 | −6.251928 | −6.358154 | 58.006958 | −73.672300 |
| 3 | −2.052867 | 0.284501 | −0.794966 | 19.999708 | −177.450943 | 736.738805 | −1184.73119 | 0.000000 |
| 4 | −0.329335 | −1.515676 | 2.514163 | −6.014408 | 160.425551 | −1429.87004 | 0.000000 | 0.000000 |
| 5 | 56.391564 | −1.007628 | 5.938799 | −17.162498 | 50.053083 | −106.102374 | 6.882158 | 158.211939 |
| 6 | −45.251325 | −0.053030 | 0.020052 | 0.087007 | −0.657928 | 3.005194 | −4.691595 | 2.603471 |
| 7 | −0.158976 | 0.018743 | 0.011859 | 0.182882 | −0.425446 | 0.047993 | 1.268885 | −0.889985 |

The Second Embodiment

Figure 5A:
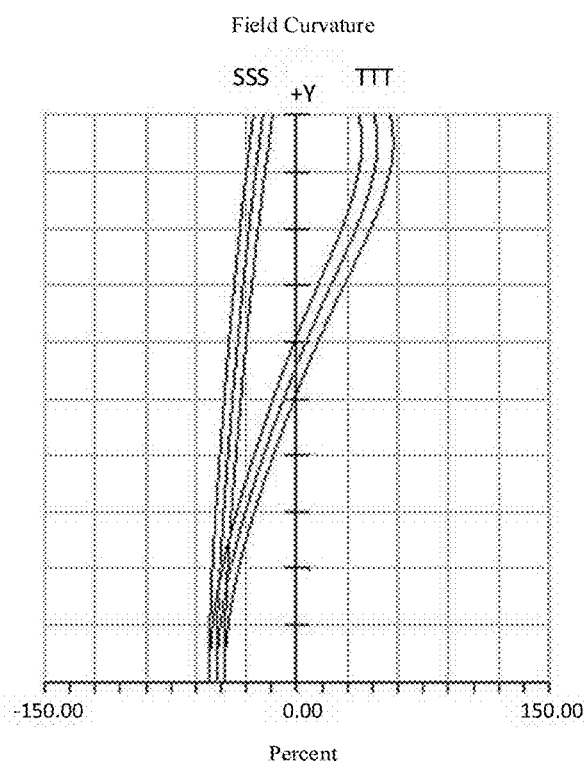
FIG. 5a is a field curve diagram of the collimating lens according to the second embodiment of the present disclosure at 40° C. and 300 mm image distance.
Figure 5B:
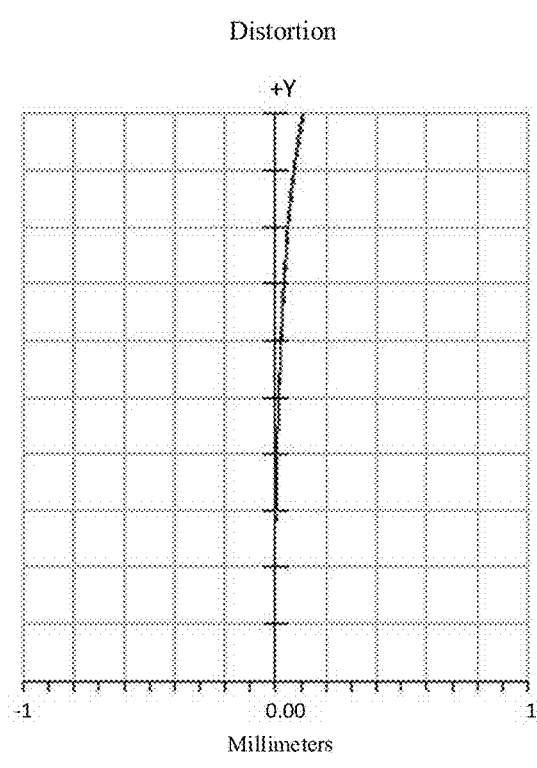
FIG. 5b is a distortion diagram of the collimating lens according to the second embodiment of the present disclosure at 40° C. and 300 mm image distance.
Figure 6:
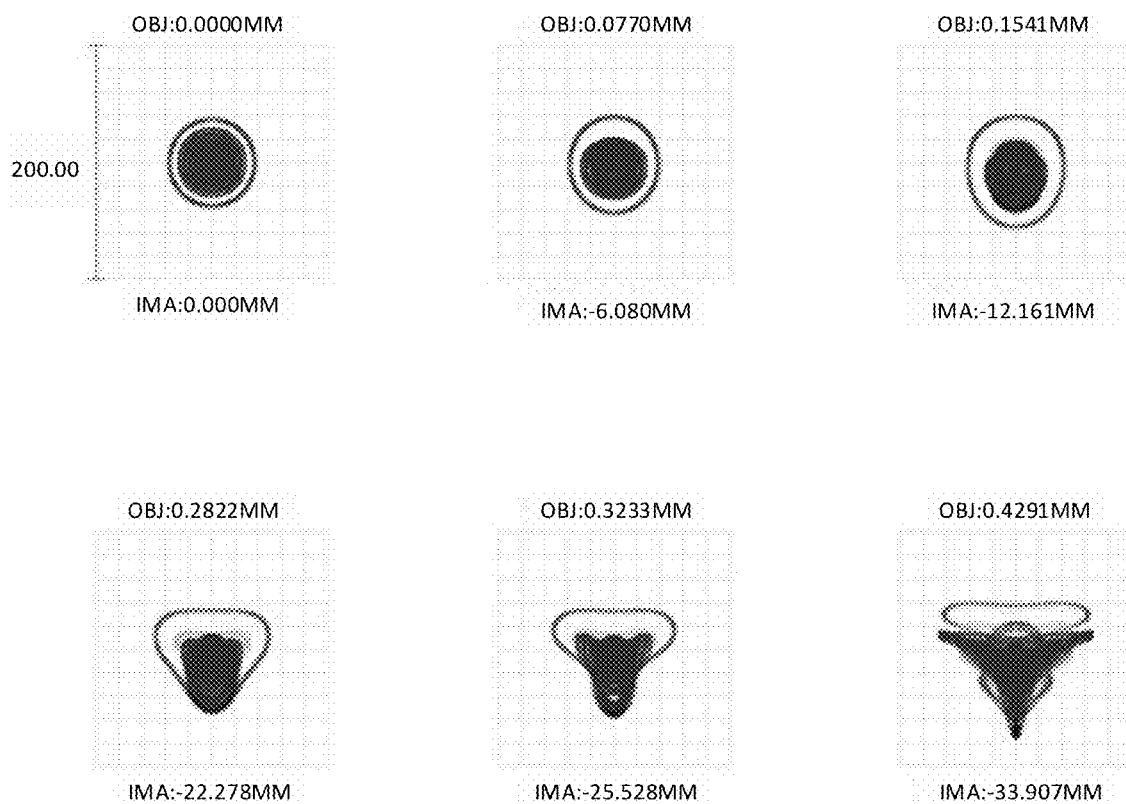
FIG. 6 is a schematic view showing the size and shape of an imaging point of the collimating lens according to the second embodiment of the present disclosure at 40° C. and 300 mm image distance, the unit of the size is micrometers.

A schematic cross-sectional view of the collimating lens provided in the second embodiment of the present invention is substantially the same as that of the first embodiment, and details are not described herein. The optical characteristic curves of the collimating lens in this embodiment are respectively shown in FIG. 5a, FIG. 5b and FIG. 6. Related parameters of each lens in the collimating lens are shown in Table 2-1.

TABLE 2-1

| Surface No. | Surface type | | r | d | $n_d$ | Vd |
|---|---|---|---|---|---|---|
| 1 | Object surface | Spherical surface | — | 0.354788 | | |
| 2 | The first lens | Aspheric surface | 0.908007 | 0.733314 | 1.711425 | 38.9048 |
| 3 | | Aspheric surface | 1.406661 | 0.983116 | | |
| 4 | The second lens | Aspheric surface | −0.496305 | 0.200864 | 1.635517 | 23.9718 |
| 5 | | Aspheric surface | −1.369756 | 0.458681 | | |
| 6 | The third lens | Aspheric surface | 4.268160 | 0.562746 | 1.544514 | 56.0033 |
| 7 | | Aspheric surface | −1.096466 | 0.045000 | | |
| 8 | The aperture stop | Spherical surface | — | 300 | | |
| 9 | The image surface | Spherical surface | — | — | | |

The parameters of the aspheric surfaces of the lenses of this embodiment are shown in Table 2-2.

TABLE 2-2

| Surface No. | k | B | C | D | E | F | G | H |
|---|---|---|---|---|---|---|---|---|
| 2 | 0 | 0.041163 | −0.292234 | 1.359335 | 0.286043 | −20.851117 | 63.67452 | −62.5594 |
| 3 | 0.276068 | 0.293194 | −1.08669 | 22.13756 | −137.206 | 283.8044 | 792.5974 | −3127.52 |
| 4 | −0.624002 | −1.51087 | 8.062083 | −103.112 | 527.4411 | 734.1484 | −16597.1 | 38509.69 |
| 5 | 2.461617 | −0.55868 | 3.663301 | −17.8475 | 71.01104 | −45.7834 | −455.994 | 858.4209 |
| 6 | −56.15819 | −0.065663 | 0.00575 | 0.322133 | −1.25224 | 3.960697 | −5.64447 | 2.669814 |
| 7 | −0.2892963 | 0.026407 | −0.081545 | 0.3249 | −0.66898 | 0.42222 | 1.153977 | −1.37831 |

The Third Embodiment

Figure 7A:
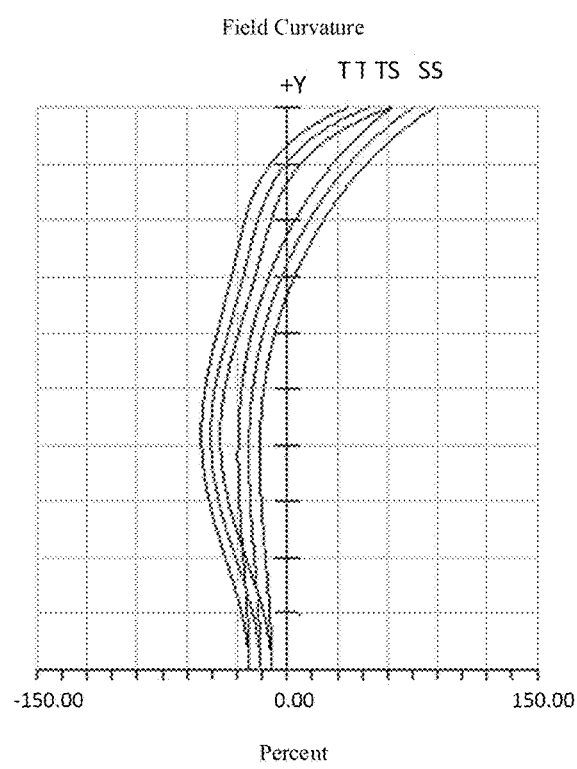
FIG. 7a is a field curve diagram of the collimating lens according to the third embodiment of the present disclosure at 40° C. and 300 mm image distance.
Figure 7B:
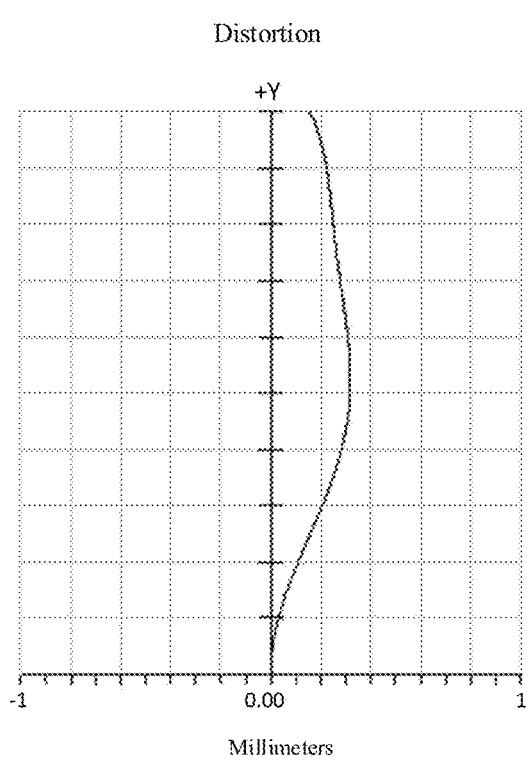
FIG. 7b is a distortion diagram of the collimating lens according to the third embodiment of the present disclosure at 40° C. and 300 mm image distance.
Figure 8:
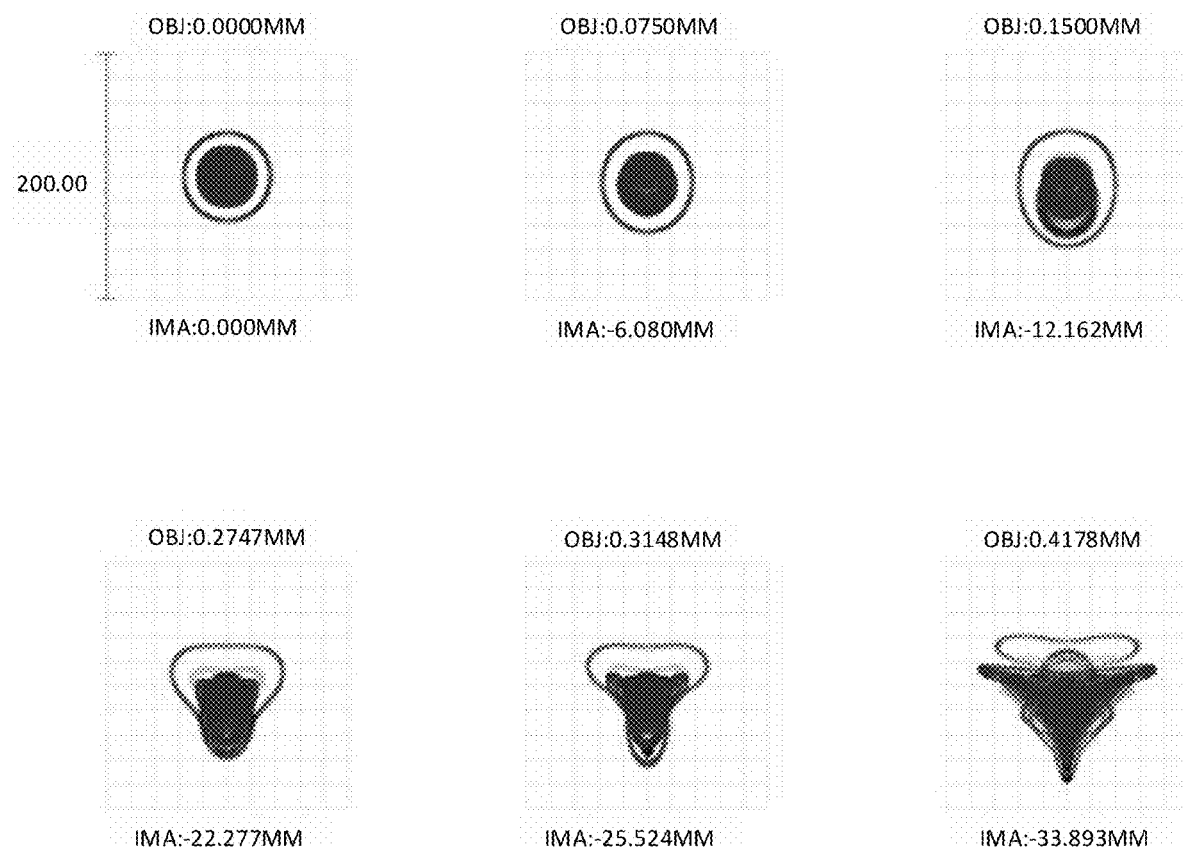
FIG. 8 is a schematic view showing the size and shape of an imaging point of the collimating lens according to the third embodiment of the present disclosure at 40° C. and 300 mm image distance, the unit of size is micrometers.

A schematic cross-sectional view of the collimating lens provided in the third embodiment of the present invention is substantially the same as that of the first embodiment, and details are not described herein. The optical characteristic curves of the collimating lens in this embodiment are respectively shown in FIG. 7a, FIG. 7b and FIG. 8. Related parameters of each lens in the collimating lens are shown in Table 3-1.

TABLE 3-1

| Surface No. | Surface type | r | d | $n_d$ | Vd |
|---|---|---|---|---|---|
| 1 | Object surface | Spherical surface | — | 0.393838 | | |
| 2 | The first lens | Aspheric surface | 0.916580 | 0.707099 | 1.750282 | 45.3712 |
| 3 | | Aspheric surface | 1.404357 | 0.958226 | | |
| 4 | The second lens | Aspheric surface | −0.482271 | 0.195094 | 1.635517 | 23.9718 |
| 5 | | Aspheric surface | −1.372532 | 0.441247 | | |
| 6 | The third lens | Aspheric surface | 4.158899 | 0.554971 | 1.544514 | 56.0033 |
| 7 | | Aspheric surface | −1.061721 | 0.05000 | | |
| 8 | The aperture stop | Spherical surface | — | 300 | | |
| 9 | The image surface | Spherical surface | — | — | | |

The parameters of the aspheric surfaces of the lenses of this embodiment are shown in Table 3-2.

TABLE 3-2

| Surface No. | k | B | C | D | E | F | G | H |
|---|---|---|---|---|---|---|---|---|
| 2 | 0 | 0.045906 | −0.330795 | 2.198233 | −4.859478 | −5.952818 | 44.364055 | −54.669484 |
| 3 | 1.011322 | 0.242824 | −0.895569 | 21.181937 | −145.167963 | 360.841583 | 615.451032 | −3141.94001 |
| 4 | −0.425016 | −1.255056 | 7.294640 | −107.545858 | 641.092328 | 990.123156 | −2.454e+4 | 6.2727e+4 |
| 5 | 2.447181 | −0.497540 | 2.895008 | −14.629954 | 75.224136 | −76.122108 | −528.682744 | 1145.181809 |
| 6 | −61.760042 | −0.037714 | −0.134465 | 0.533204 | −1.068996 | 3.215632 | −5.088362 | 2.485027 |
| 7 | −0.389608 | 0.026463 | −0.123628 | 0.445126 | −0.941891 | 0.579508 | 1.817625 | −2.238275 |

The Fourth Embodiment

Figure 9A:
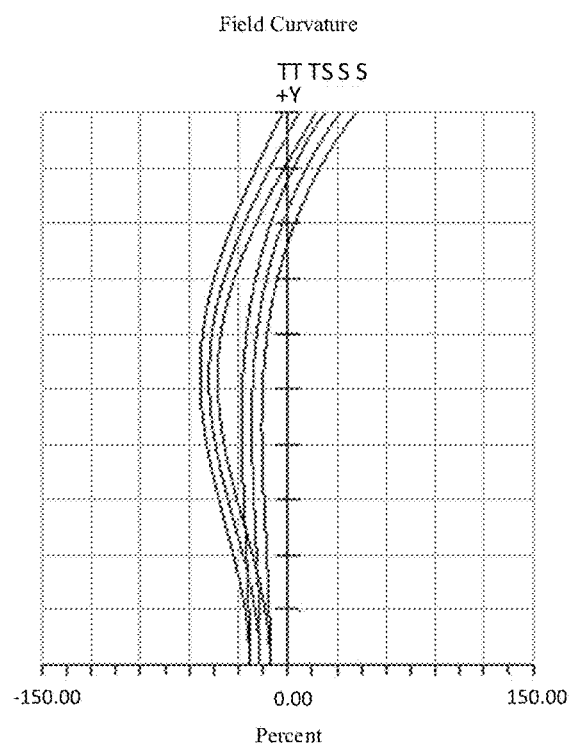
FIG. 9a is a field curve diagram of the collimating lens according to the fourth embodiment of the present disclosure at 40° C. and 300 mm image distance.
Figure 9B:
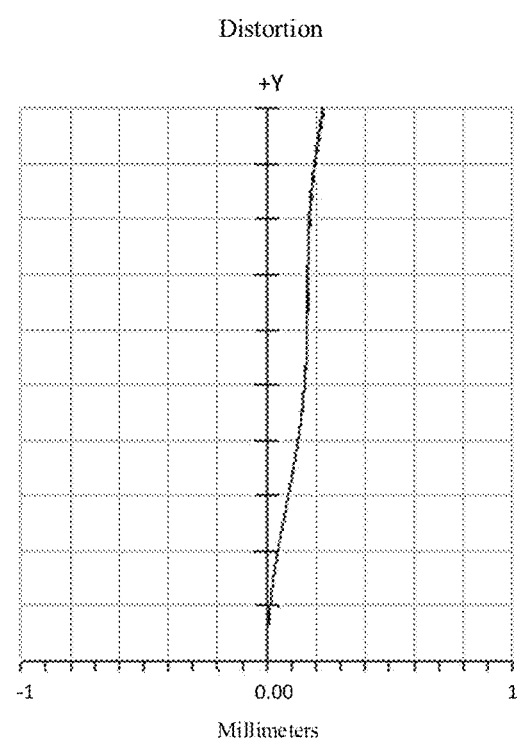
FIG. 9b is a distortion diagram of the collimating lens according to the fourth embodiment of the present disclosure at 40° C. and 300 mm image distance.
Figure 10:
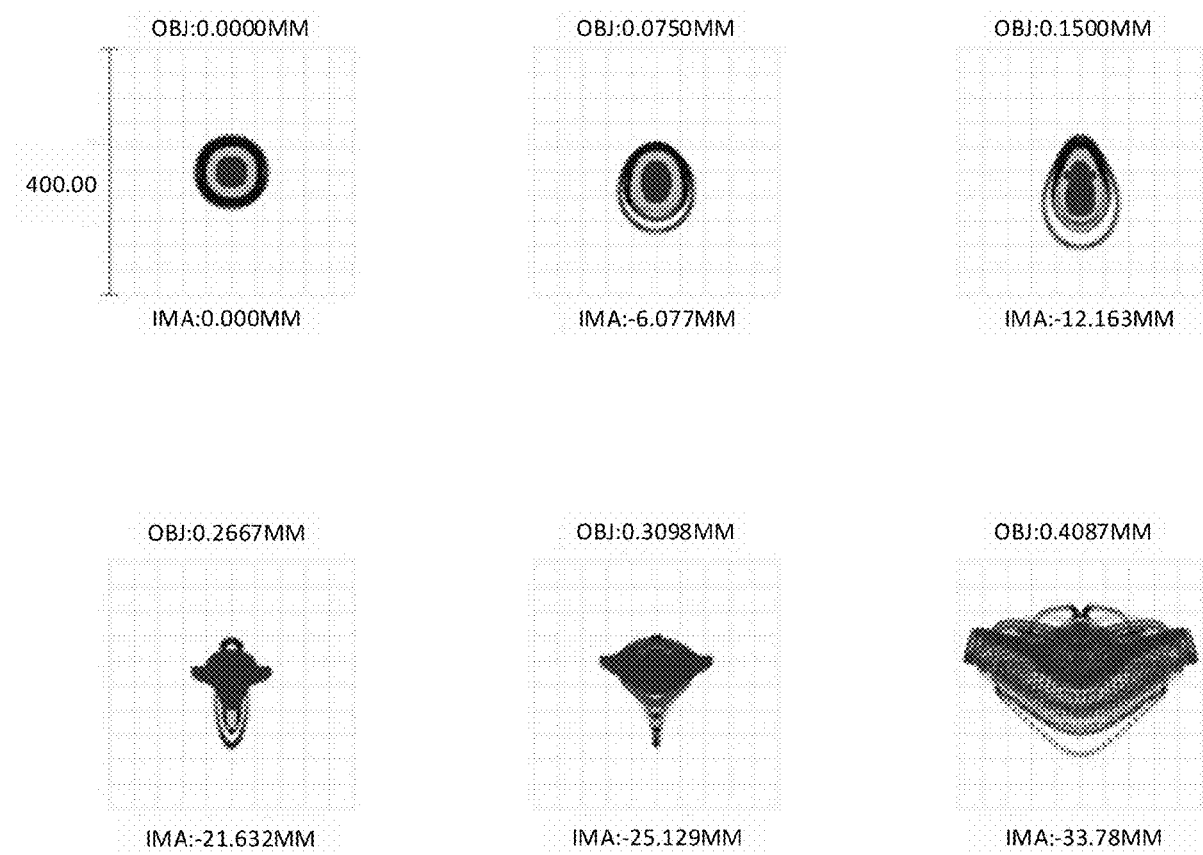
FIG. 10 is a schematic view showing the size and shape of an imaging point of the collimating lens according to the fourth embodiment of the present disclosure at 40° C. and 300 mm image distance, the unit of size is micrometers.

A schematic cross-sectional view of the collimating lens provided in the fourth embodiment of the present invention is substantially the same as that of the first embodiment, and details are not described herein. The optical characteristic curves of the collimating lens in this embodiment are respectively shown in FIG. 9a, FIG. 9b and FIG. 10. Related parameters of each lens in the collimating lens are shown in Table 4-1.

TABLE 4-1

| Surface No. | Surface type | r | d | $n_d$ | Vd |
|---|---|---|---|---|---|
| 1 | Object surface | Spherical surface | — | 0.54 | | |
| 2 | The first lens | Aspheric surface | 0.911689 | 0.721215 | 1.805881 | 40.8881 |
| 3 | | Aspheric surface | 1.786682 | 0.637815 | | |
| 4 | The second lens | Aspheric surface | −0.410008 | 0.194212 | 1.639730 | 23.5289 |
| 5 | | Aspheric surface | −6.499787 | 0.442117 | | |
| 6 | The third lens | Aspheric surface | 3.109078 | 0.614869 | 1.544514 | 56.0033 |
| 7 | | Aspheric surface | −0.899328 | 0.150000 | | |
| 8 | The aperture stop | Spherical surface | — | 300 | | |
| 9 | The image surface | Spherical surface | — | — | | |

The parameters of the aspheric surfaces of the lenses of this embodiment are shown in Table 4-2.

TABLE 4-2

| Surface No. | k | B | C | D | E | F | G | H |
|---|---|---|---|---|---|---|---|---|
| 2 | 0 | 0.080986 | −0.628158 | 3.968297 | −9.385233 | −8.533195 | 71.086705 | −90.885093 |
| 3 | −3.182377 | 0.187798 | −1.081876 | 18.582749 | −151.677812 | 466.340515 | −626.709810 | 0 |
| 4 | −0.470331 | −2.305292 | −10.445031 | 266.934801 | −1583.66231 | −2011.99327 | 0 | 0 |
| 5 | 182.868274 | −1.224336 | 9.541955 | −15.154210 | 22.815201 | −204.427789 | −56.968194 | 1997.799906 |
| 6 | −72.226784 | −0.088233 | 0.016396 | 0.245237 | −0.428286 | 2.670595 | −5.807683 | 3.732900 |
| 7 | −0.136225 | 0.014511 | 0.022595 | 0.159454 | −0.380533 | 0.213691 | 1.452431 | −1.269728 |

The Fifth Embodiment

Figure 11:
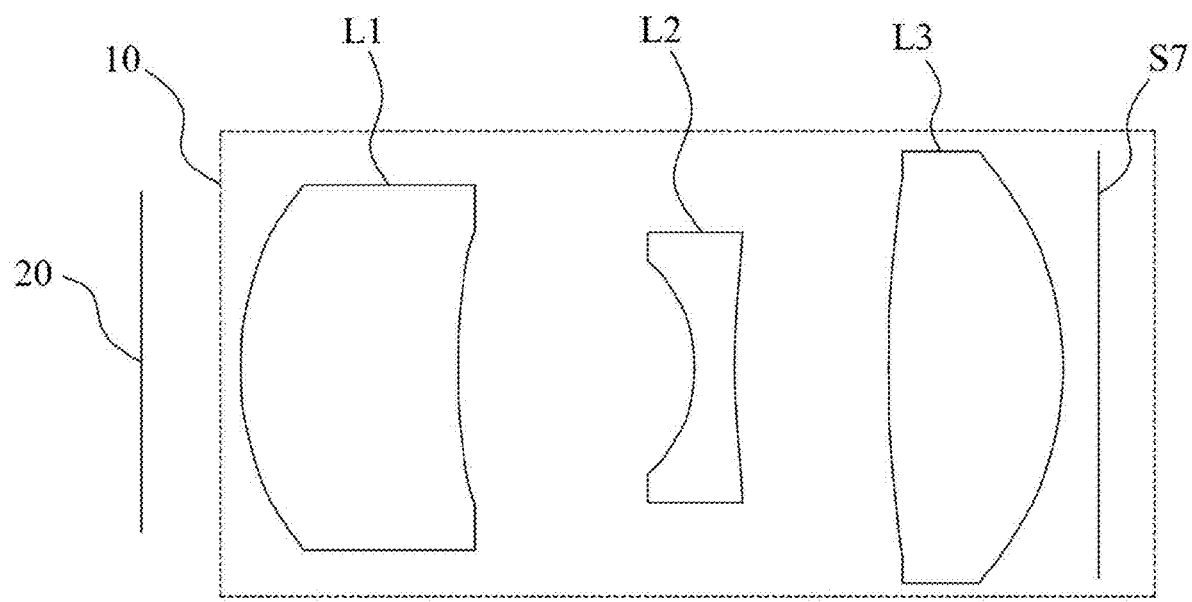
FIG. 11 is a cross-sectional view of the collimating lens according to a fifth embodiment of the present disclosure.

The cross-sectional structure diagram of the collimating lens of the fifth embodiment can be shown in FIG. 11. In this embodiment, the second lens L2 is an aspherical lens including a concave image side surface and a concave object side surface.

Figure 12A:
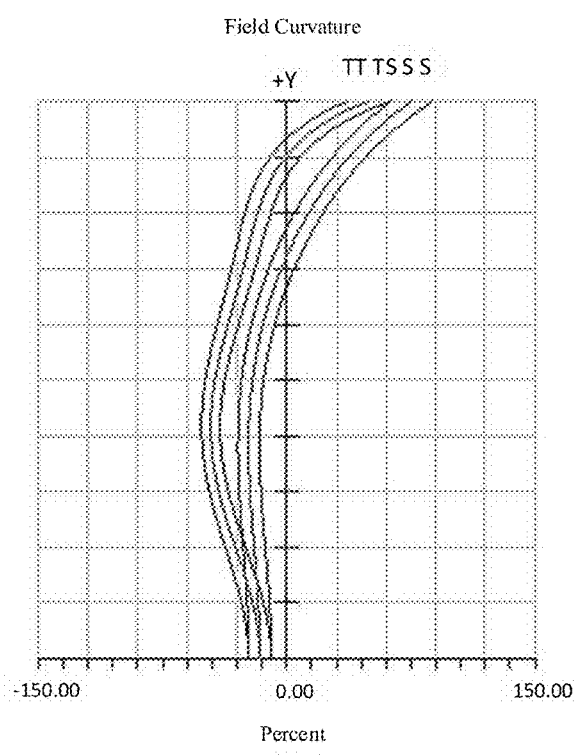
FIG. 12a is a field curve diagram of the collimating lens according to the fifth embodiment of the present disclosure at 40° C. and 300 mm image distance.
Figure 12B:
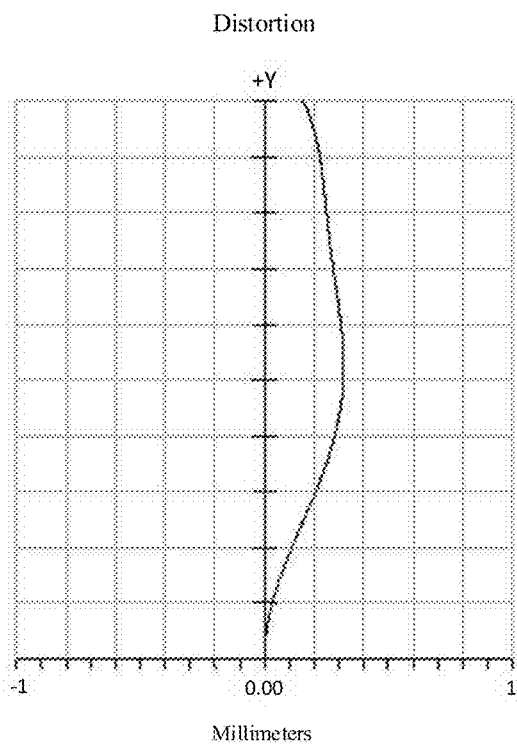
FIG. 12b is a distortion diagram of the collimating lens according to the fifth embodiment of the present disclosure at 40° C. and 300 mm image distance.
Figure 13:
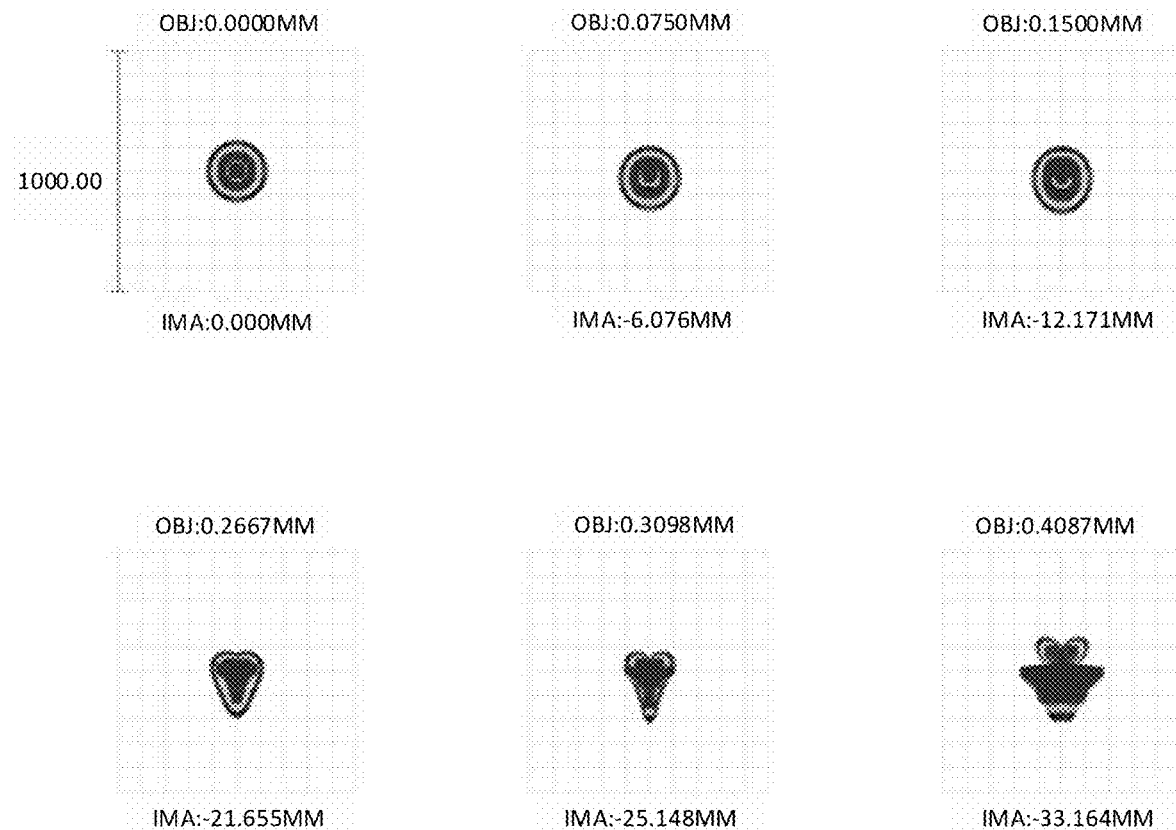
FIG. 13 is a schematic view showing the size and shape of an imaging point of the collimating lens according to the fifth embodiment of the present disclosure at 40° C. and 300 mm image distance, the unit of size is micrometers.

The optical characteristic curves of the collimating lens in this embodiment are respectively shown in FIG. 12a, FIG. 12b and FIG. 13. Related parameters of each lens in the collimating lens are shown in Table 5-1.

TABLE 5-1

| Surface No. | | Surface type | r | d | $n_d$ | Vd |
|---|---|---|---|---|---|---|
| 1 | Object surface | Spherical surface | — | 0.54 | | |
| 2 | The first lens | Aspheric surface | 0.969025 | 0.735167 | 1.805881 | 40.8881 |
| 3 | | Aspheric surface | 2.606146 | 0.544916 | | |
| 4 | The second lens | Aspheric surface | −0.570783 | 0.199103 | 1.639730 | 23.5289 |
| 5 | | Aspheric surface | 1.673211 | 0.537407 | | |
| 6 | The third lens | Aspheric surface | 3.241217 | 0.593817 | 1.544514 | 56.0033 |
| 7 | | Aspheric surface | −0.912972 | 0.150000 | | |
| 8 | The aperture stop | Spherical surface | — | 300 | | |
| 9 | The image surface | Spherical surface | — | — | | |

The parameters of the aspheric surfaces of the lenses of this embodiment are shown in Table 5-2.

TABLE 5-2

| Surface No. | k | B | C | D | E | F | G | H |
|---|---|---|---|---|---|---|---|---|
| 2 | 0 | 0.201822 | −0.950935 | 5.469013 | −12.537350 | −8.386832 | 91.371869 | −125.572614 |
| 3 | 5.143847 | 0.082651 | −0.050233 | 7.267031 | −83.900494 | 443.337369 | −1093.61391 | 0 |
| 4 | 1.416750 | −3.769269 | 16.516741 | 136.178547 | −1452.07438 | 7272.451196 | 0 | 0 |
| 5 | −57.721526 | −1.827096 | 12.255936 | −13.867216 | −53.885517 | −218.755910 | 2404.321935 | −5496.13565 |
| 6 | −10.193539 | −0.171174 | 0.043226 | 0.225561 | −0.126512 | 2.543465 | −6.803782 | 4.617762 |
| 7 | −0.055167 | 0.056573 | −0.007657 | 0.117391 | −0.264652 | 0.400753 | 1.483834 | −1.772771 |

The smaller the data range of the image point, the better the lens performance. The aberrations in each embodiment are well corrected as shown in FIG. 4, FIG. 6, FIG. 8, FIG. 10 and FIG. 13.

Table 6 shows the above four embodiments and their corresponding optical characteristics. Table 6 includes the system focal length f, the numerical aperture stop NA, and the system optical total length TTL, and values corresponding to each of the preceding conditional expressions.

TABLE 6

| Condition | The first embodiment | The second embodiment | The third embodiment | The fourth embodiment | The fifth embodiment |
|---|---|---|---|---|---|
| TTL(mm) | 3.35 | 3.34 | 3.30 | 3.30 | 3.30 |
| f(mm) | 3.7 | 3.8 | 3.7 | 3.7 | 3.7 |
| NA | 0.18 | 0.18 | 0.18 | 0.18 | 0.18 |
| TTL/f | 0.905 | 0.879 | 0.892 | 0.892 | 0.892 |
| f1-f23 | −2.24 | −1.20 | −1.26 | −2.40 | −2.86 |
| (dn/dt)1 ($10^{-6}$/° C.) | 7 | 12 | 6 | 7 | 7 |
| (dn/dt)2 ($10^{-6}$/° C.) | −113 | −114 | −114 | −113 | −113 |
| (dn/dt)3 ($10^{-6}$/° C.) | −96 | −96 | −96 | −96 | −96 |
| f3/f1 | 0.75 | 0.74 | 0.74 | 0.80 | 0.86 |
| f/r1 | 3.61 | 4.18 | 4.04 | 4.06 | 3.82 |
| r1/r6 | −1.04 | −1.83 | −1.86 | −1.01 | −1.06 |
| CT3/CT1 | 0.81 | 0.77 | 0.78 | 0.85 | 0.81 |

In the description of the present specification, the description with reference to the terms "one embodiment", "some embodiments", "example", "specific example", or "some examples" and the like means a specific feature described in connection with the embodiment or example. A structure, material or feature is included in at least one embodiment or example of the disclosure. In the present specification, the schematic representation of the above terms does not necessarily refer to the same embodiment or example. Furthermore, particular features, structures, materials, or characteristics described may be combined in a suitable manner in any one or more embodiments or examples.

The above-mentioned embodiments are merely illustrative of several embodiments of the present disclosure, and the description thereof is more specific and detailed, however is not to be construed as limiting the scope of the disclosure. It should be noted that various variations and modifications may be made by those skilled in the art without departing from the spirit and scope of the disclosure. Therefore, the scope of the disclosure should be determined by the appended claims.

What is claimed is:

1. A collimating lens, in order from a laser transmitter side to a to-be-measured object side, comprising:
   a first lens with positive refractive power, comprising a convex object side surface;
   a second lens with negative refractive power, comprising a concave object side surface;
   a third lens with positive refractive power, comprising a convex image side surface;
   an aperture stop on the to-be-measured object side;
   optical centers of each lens being on a same line; and
   the collimating lens satisfying the following conditions:

$f1 < f23$;

$(dn/dt)1 > -10 \times 10^{-6}$/° C.;

$(dn/dt)2 < -50 \times 10^{-6}$/° C.;

$(dn/dt)3 < -50 \times 10^{-6}$/° C.;

wherein, the laser transmitter side is an object side, the to-be-measured object side is an image side, f1 is a focal length of the first lens, f23 is a combined focal length of the second lens and the third lens, (dn/dt)1 is a change rate of a refractive index of the first lens with temperature in a range of 0~60° C., (dn/dt)2 is a change rate of a refractive index of the second lens with temperature in a range of 0~60° C., and (dn/dt)3 is a change rate of a refractive index of the third lens with temperature in a range of 0~60° C.

2. The collimating lens as claimed in claim 1, wherein the collimating lens satisfies the following condition:

$TTL/f < 1.0$, wherein, TTL is a total length of the collimating lens, and f is a focal length of the collimating lens.

3. The collimating lens as claimed in claim 1, wherein the collimating lens satisfies the following condition:

$0 < f3/f1 < 5$, wherein, f3 is a focal length of the third lens.

4. The collimating lens as claimed in claim 1, wherein the collimating lens satisfies the following condition:

$0 < f/r1 < 10$, wherein, f is a focal length of the collimating lens, and r1 is a radius of curvature of the object side surface of the first lens.

5. The collimating lens as claimed in claim 1, wherein the collimating lens satisfies the following condition:

$-10 < r1/r6 < 0$, wherein, r1 is a radius of curvature of the object side surface of the first lens, r6 is a radius of curvature of the image side surface of the third lens.

6. The collimating lens as claimed in claim 1, wherein the collimating lens satisfies the following condition:

$0 < CT3/CT1 < 5$, wherein, CT1 is a center thickness of the first lens, and CT3 is a center thickness of the third lens.

7. The collimating lens as claimed in claim 1, wherein an image side surface and an object side surface of the first lens, the second lens and the third lens are aspherical surfaces.

8. The collimating lens as claimed in claim 7, wherein a shape of the aspherical surface of each lens satisfies the following condition:

$$z = \frac{ch^2}{1 + \sqrt{1-(1+k)c^2h^2}} + Bh^4 + Ch^6 + Dh^8 + Eh^{10} + Fh^{12} + Gh^{14} + Hh^{16},$$

wherein, z is a vector height between a position on the aspheric surface and a vertex of the aspheric surface along an optical axis of the collimating lens, c is a curvature of the aspheric surface, k is a quadratic surface coefficient, h is a distance between the position and the optical axis, B is a fourth order surface coefficient, C is a sixth order surface coefficient, D is an eighth order surface coefficient, E is a tenth order surface coefficient, F is a twelve order surface coefficient, G is a fourteen order surface coefficient, H is a sixteen order surface coefficient.

9. The collimating lens as claimed in claim 1, wherein the first lens is made of glass, the second lens and the third lens are made of plastic.

10. The collimating lens as claimed in claim 1, wherein (f1−f23) is −2.24, (dn/dt)1 is 7×10$^{-6}$/° C., (dn/dt)2 is −113×10$^{-6}$/° C. and (dn/dt)3 is −96×10$^{-6}$/° C.

11. The collimating lens as claimed in claim 1, wherein (f1−f23) is −1.20, (dn/dt)1 is 12×10$^{-6}$/° C., (dn/dt)2 is −114×10$^{-6}$/° C. and (dn/dt)3 is −96×10$^{-6}$/° C.

12. The collimating lens as claimed in claim 1, wherein (f1−f23) is −1.26 (dn/dt)1 is 6×10$^{-6}$/° C., (dn/dt)2 is −114×10$^{-6}$/° C. and (dn/dt)3 is −96×10$^{-6}$/° C.

13. The collimating lens as claimed in claim 1, wherein (f1−f23) is −2.40 (dn/dt)1 is 7×10$^{-6}$/° C., (dn/dt)2 is −113×10$^{-6}$/° C. and (dn/dt)3 is −96×10$^{-6}$/° C.

14. The collimating lens as claimed in claim 1, wherein (f1−f23) is −2.86, (dn/dt)1 is 7×10$^{-6}$/° C., (dn/dt)2 is −113×10$^{-6}$/° C. and (dn/dt)3 is −96×10$^{-6}$/° C.

15. The collimating lens as claimed in claim 2, wherein TTL<3.5 mm, and f>3.5 mm.

16. A collimating lens, in order from a laser transmitter side to a to-be-measured object side, comprising:
a first lens with positive refractive power, comprising a convex object side surface;
a second lens with negative refractive power, comprising a concave object side surface;
a third lens with positive refractive power, comprising a convex image side surface; and;
an aperture stop on the to-be-measured object side;
wherein optical centers of various lenses are on a same line; and
the collimating lens satisfies the following conditions:

$(dn/dt)1 > -10 \times 10^{-6}/° C.;$ $(dn/dt)2 < -50 \times 10^{-6}/° C.;$ $(dn/dt)3 < -50 \times 10^{-6}/° C.;$ $0 < f3/f1 < 5,$ wherein, the laser transmitter side is an object side, the to-be-measured object side is an image side, (dn/dt)1 is a change rate of a refractive index of the first lens with temperature in a range of 0~60° C., (dn/dt)2 is a change rate of a refractive index of the second lens with temperature in a range of 0~60° C., (dn/dt)3 is a change rate of a refractive index of the third lens with temperature in a range of 0~60° C., f3 is a focal length of the third lens, and f1 is a focal length of the first lens.

17. The collimating lens as claimed in claim 16, wherein the collimating lens satisfies the following condition:

$0 < f/r1 < 10,$ wherein, f is a focal length of the collimating lens, and r1 is a radius of curvature of the object side surface of the first lens.

18. The collimating lens as claimed in claim 16, wherein the collimating lens satisfies the following condition:

$0 < f/r1 < 10,$ wherein, r1 is a radius of curvature of the object side surface of the first lens, and r6 is a radius of curvature of the image side surface of the third lens.

19. A collimating lens, in order from a laser transmitter side to a to-be-measured object side, comprising:
a first lens with positive refractive power, comprising a convex object side surface;
a second lens with negative refractive power, comprising a concave object side surface;
a third lens with positive refractive power, comprising a convex image side surface;
an aperture stop on the to-be-measured object side;
wherein optical centers of various lenses are on a same line; and
the collimating lens satisfies the following conditions:

$(dn/dt)1 > -10 \times 10^{-6}/° C.;$ $(dn/dt)2 < -50 \times 10^{-6}/° C.;$ $(dn/dt)3 < -50 \times 10^{-6}/° C.;$ $0 < f/r1 < 10,$ wherein, the laser transmitter side is an object side, the to-be-measured object side is an image side, (dn/dt)1 is a change rate of a refractive index of the first lens with temperature in a range of 0~60° C., (dn/dt)2 is a change rate of a refractive index of the second lens with temperature in a range of 0~60° C., (dn/dt)3 is a change rate of a refractive index of the third lens with temperature in a range of 0~60° C., f is a focal length of the collimating lens, and r1 is a radius of curvature of the object side surface of the first lens.

20. The collimating lens as claimed in claim 19, wherein the collimating lens satisfies the following condition:

$-10 < r1/r6 < 0,$ wherein, r6 is a radius of curvature of the image side surface of the third lens.

* * * * *